United States Patent [19]

Pastore

[11] Patent Number: 4,846,966
[45] Date of Patent: Jul. 11, 1989

[54] TRASH RACK

[76] Inventor: Joseph Pastore, 250 Foreside Rd., Cumberland, Me. 04021

[21] Appl. No.: 245,282

[22] Filed: Sep. 16, 1988

[51] Int. Cl.[4] .................. B01D 35/02; B01D 35/30
[52] U.S. Cl. ................................. 210/153; 210/154; 210/162; 210/170; 210/486; 210/488; 428/160
[58] Field of Search ........ 210/153, 154, 155, 158–159, 210/160, 162, 163, 166, 170, 486, 488; 405/52, 75, 78; 290/52, 53, 54; 428/160; 156/198

[56] References Cited

U.S. PATENT DOCUMENTS

| | | | |
|---|---|---|---|
| 2,930,485 | 3/1960 | Nordell | 210/159 |
| 4,045,350 | 8/1977 | Kupf et al. | 210/486 |
| 4,229,304 | 10/1980 | Fismer | 210/486 |
| 4,326,819 | 4/1982 | Atencid | 290/53 |
| 4,430,142 | 2/1984 | Ochi et al. | 156/198 |
| 4,521,306 | 6/1985 | Day | 210/163 |
| 4,540,313 | 9/1985 | Broome | 290/52 |
| 4,594,024 | 6/1986 | Jenkner et al. | 210/154 |
| 4,746,244 | 5/1988 | Broome | 290/52 |
| 4,790,935 | 12/1988 | Johnson | 210/486 |
| 4,793,928 | 12/1988 | Tsukamoto et al. | 210/486 |

OTHER PUBLICATIONS

Parkinson, "Frazil Ice Problems at Trash Racks," Winter Operation-Ice Problems, Montreal, Aug. 1987, pp. 1–10.

Primary Examiner—Richard V. Fisher
Assistant Examiner—Joseph Drodge
Attorney, Agent, or Firm—Thomas L. Bohan

[57] ABSTRACT

Injection-molded intake-water filtering apparatus designed for use with electric power generating stations and the like, comprising a rectangular elastomeric grid in which the number and spacing of the longitudinal elements are both adjustable. The lateral spacing between the longitudinal elements is established by cylindrical sleeves through which pass transverse rods which bind together the longitudinal elements to form the grid. The elastomeric material used is of a hardness, strength, and elasticity necessary to resist the large forces to which the trash rake is exposed and sufficiently smooth that ice-nucleating centers and marine-growth anchors are effectively absent on the surface of the finished grid.

8 Claims, 1 Drawing Sheet

TRASH RACK

BACKGROUND OF THE INVENTION

1. TECHNICAL FIELD

My invention relates to grating apparatus designed to provide a relatively lightweight, maneuverable, and ice- and barnacle-repellent means of filtering the intake water needed by electric power generators and other systems demanding a large flow of water from a reservoir.

2. BACKGROUND ART

Power generating systems, be they fossil-fueled, nuclear-based, or hydro-electric, are dependent on an non-interruptable source of water. In general, water intake requirements for public utilities and private factories—especially those within the pulp and paper industry—which incorporate such generators amount to thousands of gallons of water a minute or more. Depending on the application, this demand may alternate with no water flow at all for a period of time. Nearly without exception this water is drawn from some type of open reservoir: lake, river, ocean. In part because of the flow rate of the water drawn in for this purpose, such operations have long been plagued by problems of trash and marine organism entrainment. As initial filtration to eliminate trash, large gratings of one sort or another have been placed at the point where the water first enters the system. The purpose of these initial filters, often referred to as "trash racks," is to allow nearly free flow of water while at the same time intercepting the larger components of water-borne debris. These trash racks have traditionally been made of steel, with typical dimensions of 2-3 feet by 20 feet, and oriented so that their long dimension is nearly vertical. Within the trash rack frame, there are a series of closely spaced longitudinal steel members, typically of dimensions ½"×6"×20'. In this way the trash rack constitute a highly "porous" interface between the reservoir and the water intake tunnel leading to the generator. It also constitutes a very heavy filter, given its dimensions and the specific gravity of steel: 7.2.

The tops o the nearly-vertical trash racks often extend to the water's surface. This results in the in-flowing water coming from reservoir depths ranging from zero down to 18–20 feet. Under other circumstances the entire length of the racks may be placed far under the reservoir water's surface. This includes circumstances where the racks or their equivalent are placed horizontally on the reservoir bottom.

The trash rack arrangement described above, though dominant within the industry, has been fraught with problems, and for at least 100 years operators and builders of electric power generators—indeed all systems requiring a high flow of water intake—have experimented with variations on the basic trash rack designs as well as with accessories as to be discussed below. These problems—which are inter-related—include: (1) the great weight associated with steel gratings of the size required; (2) the need for periodic painting and other maintenance, including the removal of marine organisms, especially barnacles; (3) the formation of flow-interrupting ice on those gratings located in northern regions.

The problems are inter-related in the sense that the great weight of the steel trash racks becomes particularly onerous the more frequently these racks have to be removed for maintenance or replacement. In order to prevent the steel from oxidizing (corroding) at a high rate (especially in salt water, where they are often placed), a paint coat must be maintained on the trash racks. This in turn is made more difficult because of the necessity to periodically rake the surface of the racks in order to remove debris which has collected and barnacles which have grown and which together impede the flow of water.

In recent years, the environmental protection prohibitions placed on the use of barnacle-repelling paints have worsened this problem, in the sense that it increases the frequency with which steel trash racks need to be rid of barnacles and the like. Because of the gratings' weight, typically equalling several thousand pounds, their removal is not a trivial undertaking. Because of the function they fulfill, they are commonly located so that placement and removal cannot be accomplished directly from land but must be done from a barge anchored just in front of the water intake point, a requirement which introduces many additional complications. In addition to the periodic pulling of the trash racks for maintenance, there is much effort devoted to their cleaning while they are submerged. This in situ cleaning involves various jury-rigged scrappers and brushes being hauled across the trash racks from above, something which tends to damage the racks' protective paint covering, hastening the need for removal and re-painting—especially where sea water immersion is involved.

A more subtle but potentially much more disastrous problem is ice formation on the grating. The consequences of such formation can range from an interruption of power output up to and including the destruction of the generator. (Depending on the particular circumstances, an intermediate level of damage can be the destruction of the trash rack.)

Contrary to common belief, ice can form on or accumulate on objects beneath the water without being linked to surface ice. Although the distinctions are sometimes blurred, the ice forming on submerged structures such as trash racks can be categorized as either anchor ice or frazil ice. The former depends upon a "supercooling" of the water below its normal freezing point in the vicinity of the underwater objects. It also depends for its formation on the presence of nucleation sites at which the initial crystallization of ice from the supercooled water can occur. Frazil ice build-up on the other hand commences with the adherence of already-frozen crystallites which are borne by the water flow. These crystallites may have formed near the surface of an open reservoir (even in the coldest weather it is possible for parts of the reservoir surface to remain open if the water is sufficiently turbulent) and then been pulled down by the flow pattern of the water. Given the right circumstances, frazil ice can arise and completely block off the flow of intake water in a fraction of an hour. Because of its dependence on the entrainment of crystallites, the frazil ice formation is favored by high flow rates, as well as by sub-freezing water temperatures (which enhance the "stickiness" of the crystallites). On the other hand, anchor ice as defined above generally requires still water for its formation, and may only be a problem in those trash racks involved in the on-and-off flow associated with "as needed" operation of the power generator.

The trash rack icing problem has given rise to a diversity of ad hoc solutions. These range from heating the vicinity of the intake so as either to melt the ice crystallites or to heat the racks up to a temperature where the crystallites will not adhere to the trash rack surfaces. This approach is not cost-free even in those installations where there is "waste" heat carried off. Another technique is to cavitate the water in the vicinity of the trash racks, that is, to introduce hypersonic vibrations. The resulting vibrations make it more difficult for ice to form or adhere to the trash rack surfaces. Some operations periodically direct air guns at the racks to dislodge ice; a related approach is to connect a transducer to the metal racks with which to introduce periodic hypersonic vibrations so as to interrupt the sticking of frazil ice and to dislodge that ice which has adhered.

Yet another approach in the battle with icing at the water intake is to locate the water intake at great depths below the surface, at depths below which the frazil ice is thought to form. Although there is some controversy about the existence of such a frazil ice cut-off depth, many workers believe that at a depth greater than 30 feet the water is free of frazil ice crystallites regardless of the air temperature. Thus, by placing the intake filter on the bottom of a sufficiently deep reservoir and orienting it horizontally—as is taught by Jenkner et al. in "Offshore Intake Structure," U.S. Pat. No. 4,594,024— one might escape the icing problem. It has to be noted that just placing the intake system below the putative cut-off depth is not enough, since water is drawn in from a considerable height above the bottom. For example, if one allows a typical height of 15 feet for this in-drawing and accepts the 30-foot figure for frazil cut-off, the intake filter must be located on the bottom of a reservoir in greater than 45 feet of water. (Other workers have reported frazil ice blockage of a horizontal intake at a reservoir depth of 55 feet, though there is no estimate of the thickness of the horizontal layer from which the intake water was being drawn at the time.)

For a recent discussion of the trash rack icing problem and the range of attempted solutions, see "Frazil Ice Problems at Trash Racks," a paper delivered by F.E. Parkinson at the August, 1987, conference: Hydro Operation and Maintenance: Winter Operation—Ice Problems [sponsored jointly by the Canadian Electrical Association, the Electric Power Research Institute, and Hydro Quebec]. This paper also refers to an 1888 engineering publication dealing with the formation of frazil ice at water intakes in northern climes—an indication of the duration of time over which a solution to the problem has been sought.

All of the prior approaches to ridding the intake system of the icing problem introduce significant costs of their own, in terms of out-of-pocket expenses—e.g., for cavitation—or in terms of the severe constraints they impose on the design options available. One often does not have a choice as to what depth and at what orientation one is going to place the water intake point. Thus, it is seen that a simple means limited to the rack itself of reducing the icing problem and one which also makes the racks more durable and more maneuverable constitutes a significant improvement over the prior art. My invention consists of trash racks constructed entirely or nearly entirely of impact- and abrasion-resistant elastomers which are extremely smooth and of great hardness. Because of their effective lack of nucleation sites, these racks will not collect anchor ice and also will greatly retard if not prevent completely the adherence of frazil ice. Because of its strength, the elastomeric material used can be formed into trash racks of the same dimensions (and, consequently, the same porosities) as the traditional steel racks. Furthermore, its density about 1/6 that of steel results in racks which are about 1/6 the weight of the steel ones they replace. It is only recently that the material has been developed which would permit the mold-casting of very hard elastomers into the large elements needed for the racks. The largest elements are the longitudinal members, which can be cast from elastomers, in particular, polyurethane, with a resulting hardness of 75-95 D on the Shore Durometer scale.

The only prior approach of which I am aware that would make use of the ultra-smooth non-sticky surfaces available from certain elastomers involves coating traditional steel racks with thin elastomer films. Experience to date has shown that this material is easily torn, allowing the underlying ferrous metal to corrode and also providing additional ice-formation and barnacle-attachment sites. Attention is called to U.S. Pat. Nos. 4,594,024 and 4,521,306, and to "Frazil Ice Problems at Trash Racks," op.cit., "Solving icing problem at power plant intakes," by Y.G. Mussalli and B. Budziak, pp. 58-59, *Power Engineering*, August, 1981, and "Frazil Ice Control Using Electromechanical Vibrators and Ice-Resistant Coatings," by Y.G. Mussalli, L.S. Gordon, and S.F. Daly, pp. 1568-1576 in WATERPOWER '87, Brian W. Clowes, editor (1987).

SUMMARY OF THE INVENTION

The present invention is basically the application of newly-developed elastomeric material to the fabrication of water-intake trash racks, wherein the shift in materials from those used traditionally retards the accumulation of barnacles and other marine organisms, repels the formation of ice which tends to block water intake in cold climates, and simultaneously effects an increase in rack maneuverability and durability. The resistance to barnacle accumulation and ice formation depends on the much smoother surface presented by the new material compared to that of the ferrous metals used for traditional racks. Instead of applying an elastomer coating to traditional steel trash racks, something which does not provide a lasting solution to the problem and which also does not address the maneuverability problem, the present invention involves constructing the entire trash rack—the linking elements as well as the vertical members—from strong, lightweight elastomer, especially polyurethane. In addition, the use of solid plastic vertical members allows the leading edge of the grating to be easily shaped for the reduction of turbulence resulting from the passage of the intake water. This in turn reduces the pump power needed to maintain the requisite flow rate of intake water and increases the net operating efficiency of the power generator.

PREFERRED EMBODIMENT

The drawings depict the preferred embodiment of the invention. For definiteness, certain geometrical proportions are utilized in these drawings; the proportions chosen are not meant in any way as limiting constraints on the subject matter claimed. For example, the drawings show a rectangular trash rack for which the ratio of the length to width is about 11:1 and which is oriented nearly vertically. In practice, the trash rack may be of any shape and, depending on the particular location of the intake tunnel, may have any orientation. Furthermore, although (for illustrative purposes), the trash rack is shown in association with a nuclear-fueled power generator, claim is made to the use of this type of trash rack for filtering in all situations where a large flux of water from a external source is to be filtered.

Figure 1:
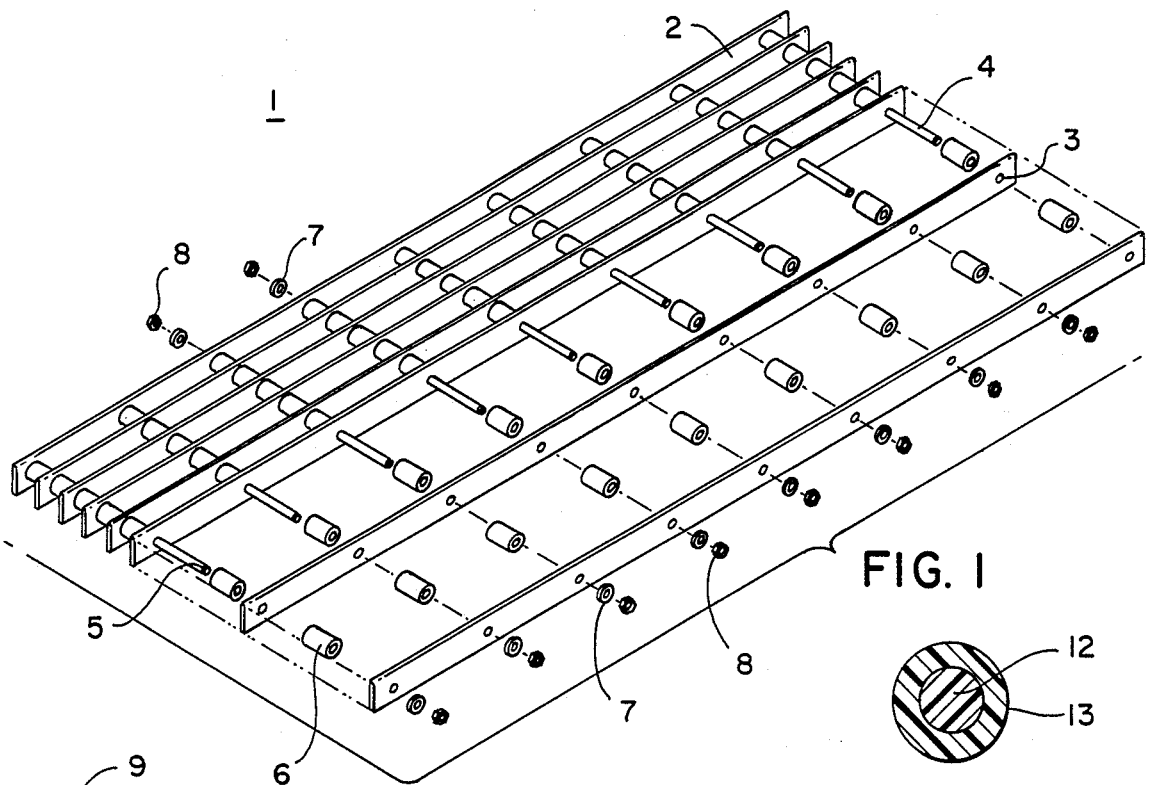
FIG. 1 is a partially "blown-up" view of the trash rack.

FIG. 1 is a partially exploded view of the trash rack 1 showing: a plurality of longitudinal elements 2 solid except for periodic circular openings 3; a plurality of transverse rods 4 with threaded ends 5 which link together said plurality of longitudinal elements 2; a plurality of spacers 6 concentric with said rods 4 which establish and maintain the mutual separation of said plurality of longitudinal elements 2; a plurality of washer pairs 7 located at the respective ends of and concentric with said rods 4; and a plurality of nut pairs 8 which screw onto said ends 5 of said rods 4 so as to fasten the entire trash rack 1 assemblage together.

Figure 1A:
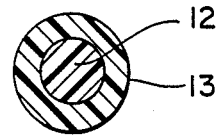
FIG. 1a shows the internal construction of the rods.

Additionally in the preferred embodiment and as shown in FIG. 1a, said transverse rods 4 consist of a composite coaxial structure that comprises a central core 12 of cast thermoset plastic or steel surrounded by a cylindrical sleeve 13 formed of polyurethane of hardness 80 on the D scale. Said composite ensures that said rods 4 have both stiffness (provided by core) and strength and toughnsss (provided by polyurethane sleeve).

Figure 1B:
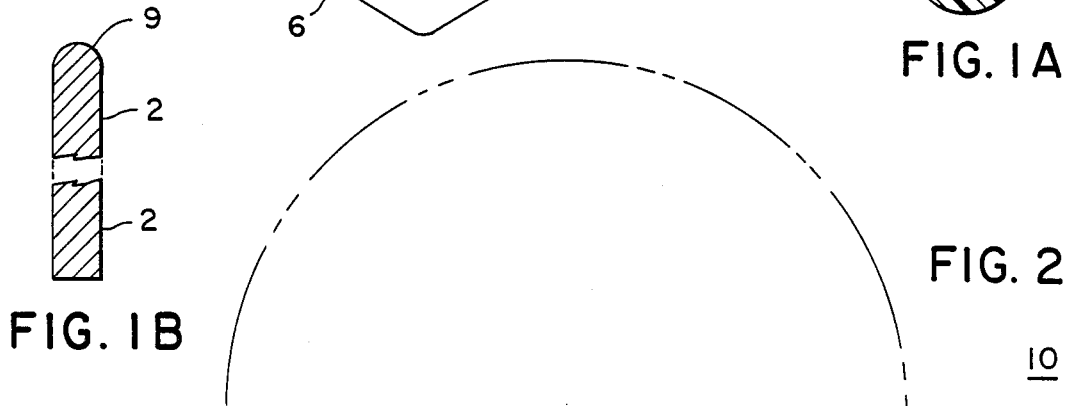
FIG. 1b shows the formed edges of the longitudinal elements.

FIG. 1b shows a cross section of longitudinal elements 2, wherein the beveling on the leading edges 9 of said longitudinal elements 2 is provided as a means of reducing the turbulence introduced into the intake water by the presence of said trash racks 2.

Figure 2:
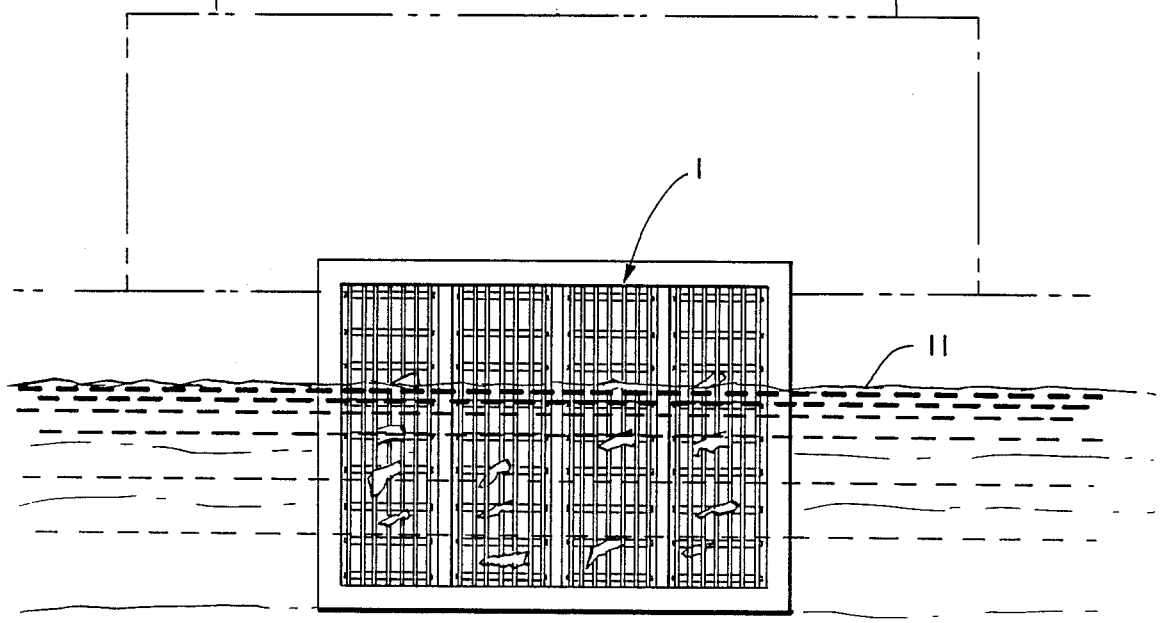
FIG. 2 is a stylized representation of family of trash racks at the cooling water intake of a nuclear power reactor.

FIG. 2 is a stylized depiction of an array 10 of said trash racks 1 in place at the water intake of an electric power generator. In this view said array 10 is shown partially above and partially below the water surface 11, as might be the case where the intake water reservoir is a tidal basin.

The basic invention consists of adapting to the manufacture of trash racks an elastomeric material newly-available for the cast-molding of objects as large as said longitudinal elements 2. In the preferred embodiment: said longitudinal elements 2 are cast-molded from polyether-based polyurethane of hardness 80–95 on the Shore D durometer scale; said washers 7 are cast of polyurethane of hardness 80 on the Shore D durometer scale; said nuts 8 are cast-molded from polyurethane of hardness 80–95 on the Shore D scale.

The polyurethane used for all the above elements has pigmentation and ultra-violet inhibitors added as a means of increasing the resistance of the finished elements to any deleterious photo-effects resulting from the trash racks' continual exposure to sunlight.

In the preferred embodiment, the mutual separation of said longitudinal elements 2 and also the longitudinal distribution of said transverse rods 4 can be varied, the former by the length chosen for said spacers 6, the latter by the longitudinal positioning chosen for said periodic circular openings 3 in said longitudinal elements 2. The location of said circular openings 3 is easily established during the cast-molding of said longitudinal elements z by the placement of plugs at strategic locations in the mold prepared for the casting.

I claim:

1. Trash rack apparatus for filtering intake water for use with power generators comprising:
    (a) a plurality of longitudinal elements made of an elastomeric material;
    (b) elastomeric means for establishing lateral spacing between said longitudinal elements; and
    (c) means for linking said longitudinal elements together in a parallel fashion so as to form a stable grid,
wherein the means for linking comprises a plurality of rods, each rod having an internal core, made of a strong rigid material, and an external layer, coaxial with said internal core, made of an elastomeric material, wherein said rods span each space between said longitudinal elements and connect said longitudinal elements rigidly to one another to form the stable grid.

2. Apparatus as claimed in 1, wherein said internal core comprises cast thermoset plastic.

3. Apparatus as claimed in 1, wherein said elastomeric material comprises polyether-based polyurethane.

4. Track rack apparatus for filtering intake water for use with power generators comprising:
    (a) a plurality of longitudinal elements made of an elastomeric material;
    (b) elastomeric means for establishing lateral spacing between said longitudinal elements; and
    (c) means for linking said longitudinal elements together in a parallel fashion so as to form a stable grid, wherein said means for linking comprises a plurality of rods, each rod having an internal core made from a strong rigid material and an external coaxial layer made of an elastomeric material, wherein said rods span each space between the longitudinal elements and connect the longitudinal elements rigidly to one another to form the stable grid;
wherein said means for linking comprises a plurality of rods and associated elastomeric washers and nuts, wherein each said rod is cylinder, externally threaded at its two extremities, wherein each rod passes serially through said longitudinal elements and is coupled to said elastomeric washers and nuts so that said longitudinal elements lie between said elastomeric washers and nuts.

5. Apparatus as claimed in 4, wherein each of said longitudinal elements has a bottom a top, a front, a back, and two side faces, the long dimension of said side faces defining the length of said longitudinal elements, the short dimension of said side faces defining the width of said longitudinal elements, and the distance between said side faces defining the thickness of said longitudinal elements, and such that the front of said grid is defined by the collective fronts of said longitudinal elements the front of said grid defining a surface which said intake water flow first contacts.

6. Apparatus as claimed in 5, wherein the front of each said longitudinal element is formed so as to present a smooth contour to a flow of said intake water.

7. Apparatus as claimed in 6, wherein said internal core comprises cast thermoset plastic.

8. Apparatus as claimed in 7, wherein said elastomeric material comprises polyether-based polyurethane.

* * * * *